United States Patent
Nielson et al.

(10) Patent No.: US 6,438,647 B1
(45) Date of Patent: Aug. 20, 2002

(54) METHOD AND APPARATUS FOR PROVIDING BATTERY-BACKED IMMEDIATE WRITE BACK CACHE FOR AN ARRAY OF DISK DRIVES IN A COMPUTER SYSTEM

(75) Inventors: Michael E. Nielson, Broomfield; Thomas E. Richardson, Golden, both of CO (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 09/602,808

(22) Filed: Jun. 23, 2000

(51) Int. Cl.[7] .............................. G06F 1/18; H02J 7/34
(52) U.S. Cl. ...................................... 711/113; 713/340
(58) Field of Search ................... 711/113, 154; 713/324, 340

(56) References Cited

U.S. PATENT DOCUMENTS

| | | | |
|---|---|---|---|
| 5,317,720 A | 5/1994 | Stamm et al. | 711/143 |
| 5,572,660 A | 11/1996 | Jones | 714/6 |
| 5,588,111 A | 12/1996 | Cutts, Jr. et al. | 714/9 |
| 5,761,705 A | 6/1998 | DeKoning et al. | 711/113 |
| 5,778,425 A | 7/1998 | Shigeeda | 711/122 |
| 5,784,548 A | 7/1998 | Liong et al. | 714/6 |
| 5,802,572 A | 9/1998 | Patel et al. | 711/143 |
| 5,835,940 A | 11/1998 | Yorimitsu et al. | 711/112 |
| 5,835,955 A | 11/1998 | Dornier et al. | 711/162 |
| 5,950,227 A | 9/1999 | Kulkarni | 711/143 |
| 5,991,852 A | 11/1999 | Bagley | 711/112 |
| 6,052,789 A | * 4/2000 | Lin | 713/300 |
| 6,239,578 B1 | * 5/2001 | Schnell et al. | 320/119 |

OTHER PUBLICATIONS

RPS819980126–"Method And Means Of Ensuring Data Integrity With Removable NVRAM Cache", IBM Technical Disclosure Bulletin No. 431, p. 550.*
JP819990842–"Battery Calibration Mechanism in RADI System", IBM Technical Disclosure Bulleting No. 436, p. 1422. (Abstract Only).*

* cited by examiner

*Primary Examiner*—David L. Robertson
(74) *Attorney, Agent, or Firm*—Altera Law Group, LLC

(57) ABSTRACT

The present invention provides a method and apparatus for providing battery-backed immediate write back cache for an array of disk drives in a computer system. Cooperation between a new replacement controller and a survivor controller is enabled so that write back cache operation can start immediately, and not be dependant on the battery condition in the replacement controller. Protection of the data through a single point of failure is maintained. When a controller fails, a replacement controller is installed and battery state information is exchanged. If any battery backup meets a predetermined threshold, all of the controllers run in the write back cache mode. However, if not one of the battery backups meets a predetermined threshold, all of the controllers run in the write through cache mode. Thus, the system does not need to wait for a replacement controller's battery backup to be reconditioned before the higher speed write back cache is used.

19 Claims, 5 Drawing Sheets

| Information | States |
|---|---|
| My battery (battery associated with each controller holding the state information) | OK - the battery can be relied upon to preserve the cache data. |
| | Not OK - the battery can not be relied upon to preserve the cache data. |
| Your battery (battery associated with another controller) | OK - the battery can be relied upon to preserve the cache data. |
| | Not OK - the battery can not be relied upon to preserve the cache data. |

Fig. 2

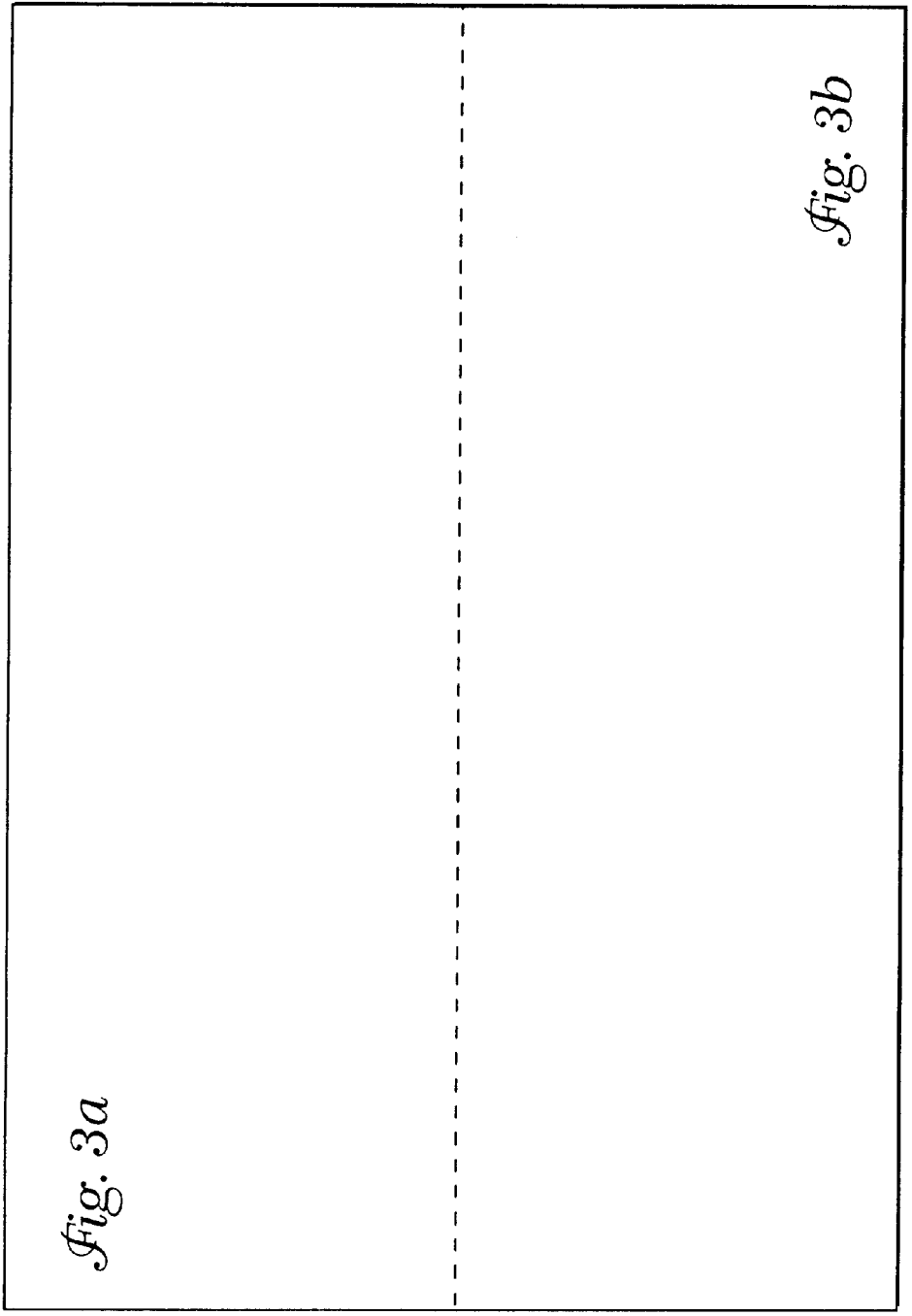

METHOD AND APPARATUS FOR PROVIDING BATTERY-BACKED IMMEDIATE WRITE BACK CACHE FOR AN ARRAY OF DISK DRIVES IN A COMPUTER SYSTEM

BACKGROUND OF THE INVENTION

1. Field of the Invention

This invention relates in general to systems and methods for controlling an array of disk drives in a computer system, and more particularly to a method and apparatus for providing battery-backed immediate write back cache for an array of disk drives in a computer system.

2. Description of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). A number of reference articles that describe the design and characteristics of disk array subsystems have been published, including the articles: "Introduction to Redundant Arrays of Inexpensive Disks (RAID)" by D. Patterson, P. Chen, G. Gibson and R. Katz, IEEE, 1989; "Coding Techniques for Handling Failures in Large Disk Arrays" by G. Gibson, L. Hellerstein, R. Karp, R. Katz and D. Patterson, Report No. UCB/CSD 88/477, December 1988, Computer Science Division, University of California Berkeley; and "A Case Study for Redundant Arrays of Inexpensive Disks (RAID)" by D. Patterson, G. Gibson, and R. Katz, presented at the June 1988 ACM SIGMOD Conference in Chicago, Ill.

Generally speaking, a disk array subsystem includes an array of standard disk drives, referred to collectively as a "composite" drive, coupled in parallel. The disk array subsystem further includes a drive array controller for interfacing the composite drive to a computer system. The drive array controller, which is generally installable on an expansion bus of the computer system, converts input-output ("I/O") read and write requests into a sequence of seeks, delays and other disk commands to read data from or write data to the composite drive.

A drive array controller differs from a conventional disk drive controller (i.e., a single disk controller) in that, with respect to the drive array controller, the set of disk drives coupled thereto emulate a single disk drive having a greater capacity and a higher performance than any individual disk drive included as a portion thereof. To perform an access to a virtual composite drive location within the composite drive, the drive array controller must be cognizant of both the position of the particular disk drive to be accessed as well as the physical sector location within that disk drive which corresponds to the virtual composite drive location for which access is sought. Various hardware and software implementations are well-known for performing these functions.

A significant concern relating to the mass storage of data within disk array subsystems is the possibility of data loss or corruption due to drive failure. A variety of data redundancy and recovery techniques have therefore been proposed to allow restoration of data in the event of a drive failure.

There are several "levels" of standard geometries defined in the Patterson publication. For example, a RAID level 1 system, comprises one or more disks for storing data and an equal number of additional "mirror" disks for storing copies of the information written to the data disks. Additional RAID levels, such as RAID level 2,3,4 and 5 systems, segment the data into portions for storage across several data disks. One of more additional disks are utilized to store error check or parity information.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

To further improve reliability, it is known in the art to provide redundant control modules to reduce the failure rate of the subsystem due to control electronics failures. In some redundant architectures, pairs of control modules are configured such that they control the same physical array of disk drives. A cache memory module is associated with each of the redundant pair of control modules.

The redundant control modules communicate with one another to assure that the cache modules are synchronized. Typically, the redundant pair of control modules communicate at their power-on initialization (or after a reset operation). While the redundant control modules complete their communications to assure synchronization of the cache modules, the RAID storage subsystem are unavailable with respect to completing host computer requests. If the cache modules are "out of sync", the time required to restore synchronization could be significant. In addition, a failure of one of the redundant pair of control modules would further extend the time during which the RAID storage subsystem would be unavailable. Manual (operator) intervention could be required to replace a defective redundant control module in order for the RAID subsystem to begin processing of host computer requests.

During normal operation, dual controllers operate in a write back mode. Write back mode refers to the process of writing data in a receiving controller's cache and then writing data in the other controller's cache before returning a completion status to the host. For dual controller systems with battery-backed data cache, when a controller fails, a replacement controller is installed. The replacement controller needs to recondition its battery before the write back cache mode is reinitiated. This is because the cache is not yet protected from a power failure. During the reconditioning period, the operation of the controller is in a write through cache mode so the data is committed to the storage media before a completion status is returned to the host. Once the battery is reconditioned the controller can change back to the write back cache mode. However, traditional replacement controllers need to condition the batteries attached to them for many hours before write back cache operations can take place. Further, the write back cache mode returns a completion status to the host much faster than the write through cache mode. Thus, the write through cache mode causes a decrease in performance for the many hours it takes to recondition the battery.

Reconditioning is required because a newly installed controller does not know the state of the battery. Reconditioning involves draining the battery down to zero charge, charging it up fully so that the controller knows how long it takes to charge the battery, bring the battery down to zero charge so the controller knows how long the battery will be able to hold the charge for the cache memory and fully recharging the battery again. Once that is known, then the controller will allow the data to be stored live in the cache and the conservative write through cache mode is changed back to the write back cache mode, which provides better performance. The battery reconditioning process generally takes 12–16 hours, during which, although they would have two controllers, the performance of the controllers would be severely degraded because the write through cache mode is used so that all of the data is written to the physical media on the disk before a successful status was returned to the host.

It can be seen that there is a need for a method and apparatus for providing battery-backed immediate write back cache for an array of disk drives in a computer system.

SUMMARY OF THE INVENTION

To overcome the limitations in the prior art described above, and to overcome other limitations that will become apparent upon reading and understanding the present specification, the present invention discloses a method and apparatus for providing battery-backed immediate write back cache for an array of disk drives in a computer system.

The present invention solves the above-described problems by enabling cooperation between a new replacement controller and the survivor controller to have write back cache operation start immediately, and not be dependant on the battery condition in the replacement controller. Protection of the data through a single point of failure is maintained. Thus, there is no waiting period and the higher speed write back cache method can be used as soon as the controller is ready to accept commands.

A method in accordance with the principles of the present invention includes: a) operating a first and a second controller in a write back cache mode when the first and second controller are in a normal state and each controller comprises a processor, a battery backup and a cache memory, b) switching the second controller to a write through cache mode when the first controller fails, c) replacing the first controller that failed with a replacement controller, d) exchanging state information regarding the battery backup for the replacement controller and the second controller, e) determining whether either battery backup of the replacement controller and the second controller meets a predetermined threshold and f) running the replacement controller and the second controller in a write back cache mode when the battery backup for the replacement controller or the second controller meets the predetermined threshold.

Other embodiments of a method in accordance with the principles of the invention may include alternative or optional additional aspects. One such aspect of the present invention is that the method further includes: g) running the replacement controller and second controller in a write through cache mode when the battery backup for the replacement controller and the second controller fail to meet the predetermined threshold.

Another aspect of the present invention is that the method further includes: h) determining whether the battery backup for the replacement controller needs reconditioning and i) reconditioning the battery backup for the replacement controller when the battery backup for the replacement controller needs reconditioning.

Another aspect of the present invention is that the method further includes switching the operation of the second controller to a write through cache mode when the replacement controller fails before the reconditioning for the battery backup for the replacement controller is completed.

Another aspect of the present invention is that the method further includes reinstalling the failed replacement controller and repeating a–i.

Another aspect of the present invention is that the method further includes switching the operation of the replacement controller to a write through cache mode when the second controller fails before the reconditioning for the battery backup for the replacement controller is completed.

Another aspect of the present invention is that the method further includes installing a second replacement controller for the failed second controller and repeating a–i.

In another embodiment of the present invention, a disk array system is provided. The disk array system includes a first and a second controller for receiving data write operations from a host, the first and second controller each further comprising a processor, a battery backup and a cache memory, the cache memory being maintained by the battery backup and an array of disks coupled to the first and second controller, wherein the processors for the first and second controller are each configured with a state machine for cooperatively sharing a state for their associated battery backup and for storing a state of the battery backup for the other controller so that the state machine for each controller knows the state of its own battery backup and the state of the battery backup of the other controller, wherein the processor operates the first and the second controller in a write back cache mode when the first and second controller are in a normal state, the processor for the second controller switching to a write through cache mode when the first controller fails and a replacement controller is installed for the failed first controller, wherein the replacement controller and the second controller share state information, and wherein the processors for the second and replacement controller determine whether either battery backup of the replacement controller and the second controller meets a predetermined threshold and run the replacement controller and the second controller in a write back cache mode when the battery backup for the replacement controller or the second controller meets the predetermined threshold.

Another aspect of the present invention is that the processor for the replacement controller and the second controller run the replacement controller and second controller in a write through cache mode when the battery backup for the replacement controller and the second controller fail to meet the predetermined threshold.

Another aspect of the present invention is that the processor for the replacement controller determines whether the battery backup for the replacement controller needs reconditioning and begins reconditioning the battery backup for the replacement controller when the battery backup for the replacement controller needs reconditioning.

Another aspect of the present invention is that the processor for the second controller switches the operation of the second controller to a write through cache mode when the replacement controller fails before the reconditioning for the battery backup for the replacement controller is completed.

Another aspect of the present invention is that the processor for the replacement controller switches the operation of the replacement controller to a write through cache mode when the second controller fails before the reconditioning for the battery backup for the replacement controller is completed.

In another embodiment of the present invention, an article of manufacture is provided. The article of manufacture includes a program storage medium readable by a computer, the medium tangibly embodying one or more programs of instructions executable by the computer to perform a method for operating a first and a second controller within a disk array system, wherein each controller comprises a processor, a battery backup and a cache memory, the method includes operating a first and a second controller in a write back cache mode when the first and second controller are in a normal state and each controller comprises a processor, a battery backup and a cache memory, switching the second controller to a write through cache mode when the first controller fails, replacing the first controller that failed with a replacement controller, exchanging state information regarding the battery backup for the replacement controller and the second controller, determining whether either battery backup of the replacement controller and the second controller meets a predetermined threshold and running the replacement controller and the second controller in a write back cache mode when the battery backup for the replacement controller or the second controller meets the predetermined threshold.

Another aspect of the present invention is that the method further includes running the replacement controller and second controller in a write through cache mode when the battery backup for the replacement controller and the second controller fail to meet the predetermined threshold.

Another aspect of the present invention is that the method further includes determining whether the battery backup for the replacement controller needs reconditioning and reconditioning the battery backup for the replacement controller when the battery backup for the replacement controller needs reconditioning.

Another aspect of the present invention is that the method further includes switching the operation of the second controller to a write through cache mode when the replacement controller fails before the reconditioning for the battery backup for the replacement controller is completed.

Another aspect of the present invention is that the method further includes reinstalling the failed replacement controller and repeating a–i.

Another aspect of the present invention is that the method further includes switching the operation of the replacement controller to a write through cache mode when the second controller fails before the reconditioning for the battery backup for the replacement controller is completed.

Another aspect of the present invention is that the method further includes installing a second replacement controller for the failed second controller and repeating a–i.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a table showing the state information that each controller must maintain and shared with the other controllers.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing battery-backed immediate write back cache for an array of disk drives in a computer system. Cooperation between a new replacement controller and a survivor controller is enabled so that write back cache operation can start immediately, and not be dependant on the battery condition in the replacement controller. Protection of the data through a single point of failure is maintained. Thus, there is no waiting period and the higher speed write back cache method can be used as soon as the controller is ready to accept commands.

Figure 1:
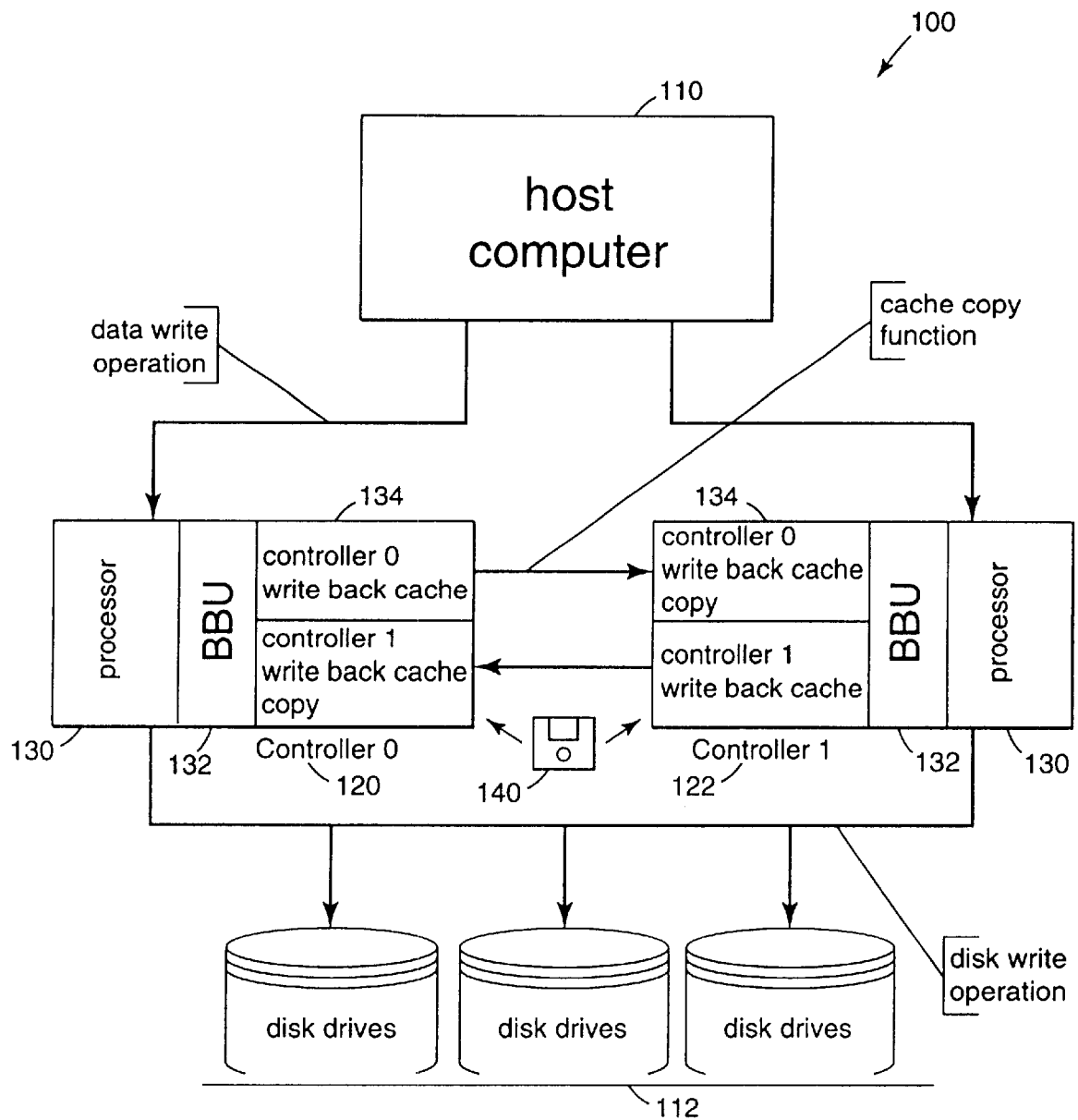
FIG. 1 illustrates a block diagram of a host and redundant disk array system according to the present invention.

FIG. 1 illustrates a block diagram 100 of a host 110 and redundant disk array system 112 according to the present invention. In FIG. 1, a host computer 110 is coupled to two controllers 120, 122. However, those skilled in the art will recognize that the present invention is not meant to be limited to implementation with two controllers. Each of the controllers 120, 122 include a processor 130, a battery backup unit (BBU) 132, and cache memory 134. Each cache 134 has a separate. supply of power in the form of the BBU 132 to preserve the data in the event of loss of primary power. Each of the BBUs 132 maintains the cache memory 134 associated therewith. Further, each cache 134 writes a copy of its content to the other controller's cache and stores a copy of the other controller's cache. Each of the controllers 120, 122 are coupled to the array of disk drives.

The present invention is generally implemented using inter-related computer programs executed by both controllers 120,122. Cooperation between two or more controllers 120, 122 is required. The computer programs executed by both controllers 120,122 implement "state" information that is kept and shared among the controllers 120,122 so that write back cache operation can start immediately, and not be dependant on the battery condition in the replacement controller. More information concerning each of the above-identified components is provided below.

All of the computer programs are comprised of instructions which, when read and executed by a computer, cause the computer to perform the steps necessary to implement and/or use the present invention. Generally, the computer programs are tangibly embodied in and/or are readable from a device, carrier, or media, such as memory, data storage devices, and/or remote devices 140. Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media 140. Of course, those skilled in the art will recognize many modifications may be made to this configuration without departing from the scope of the present invention.

Figure 3A:
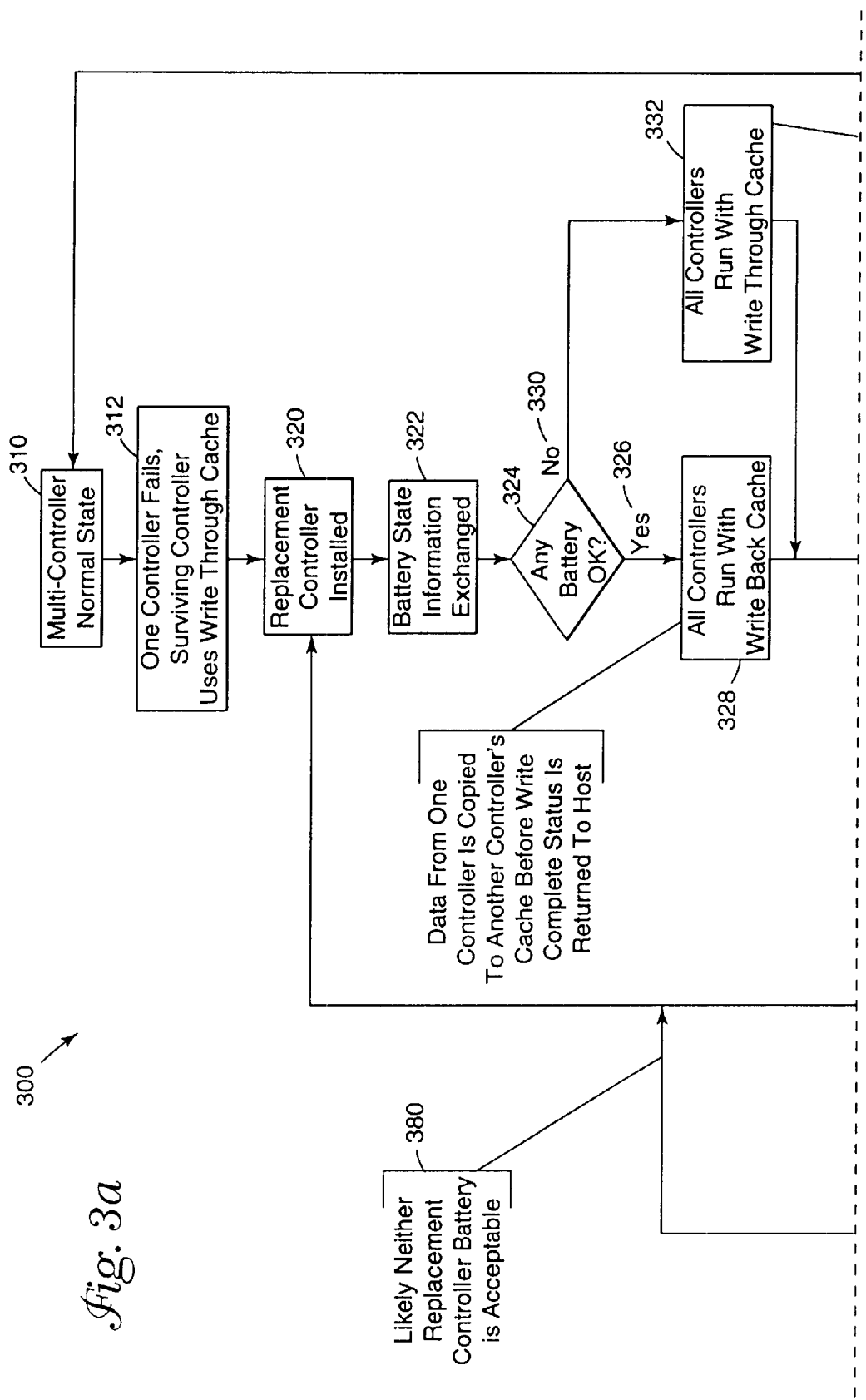
FIG. 3 illustrates a flow chart of the sequence for a failed controller replacement according to the present invention.
Figure 3B:
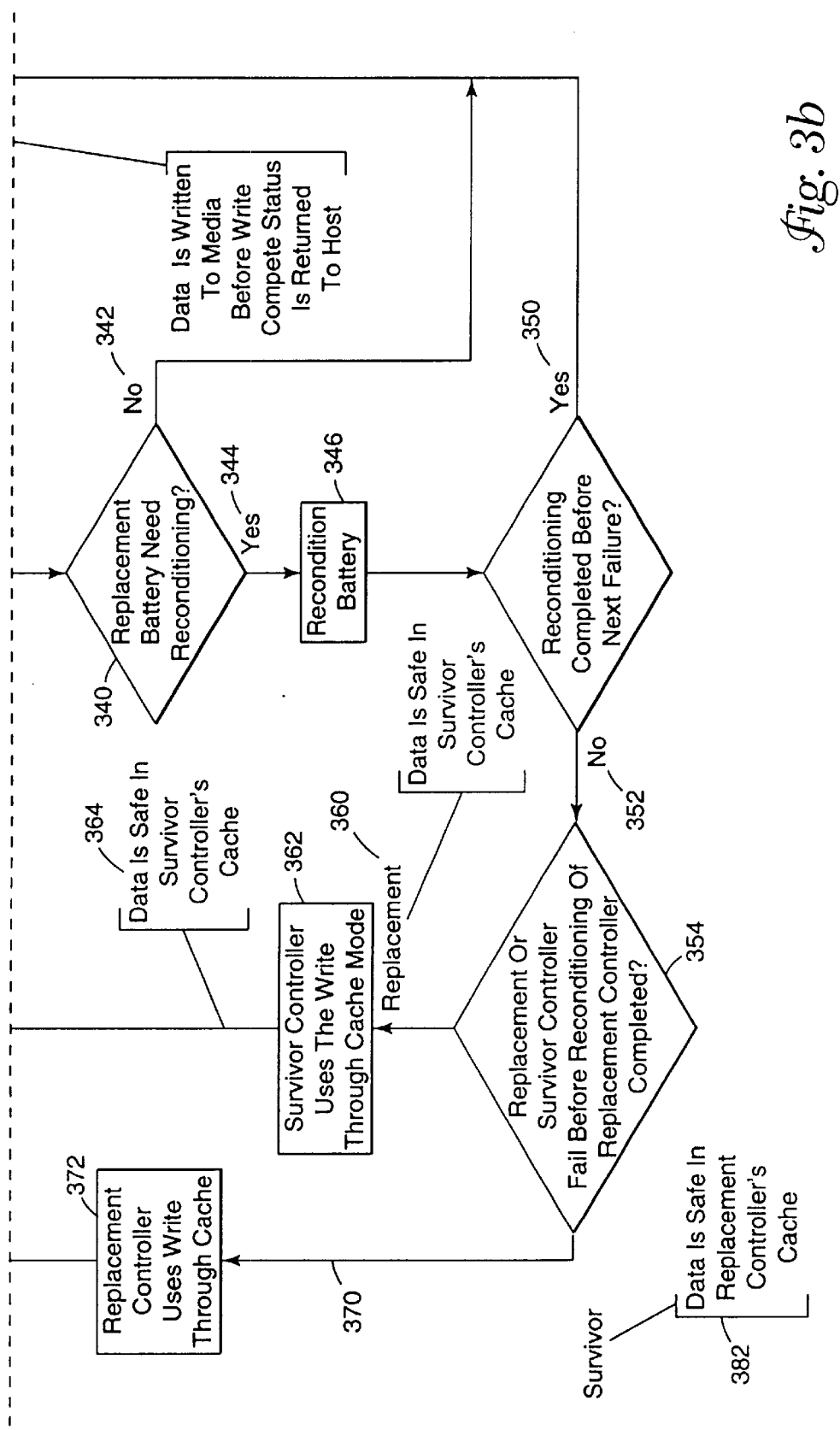

Those skilled in the art will also recognize that the exemplary environment illustrated in FIGS. 1–3 are not intended to limit the present invention. Further, those skilled in the art will recognize that other alternative hardware and software environments may be used without departing from the scope of the present invention. In addition, the discussion herein assumes the system includes only two controllers 120, 122. However, those skilled in the art will recognize that the concepts of the present invention are equally applicable and expandable to systems with more than two controllers so long as the controllers cooperate and share information about their batteries and share data.

According to the present invention, battery-backed immediate write back cache 134 is provided for an array of disk drives 112 in a computer system in the event of a controller 120, 122 failing. A controller 120,122 failing simply refers to a situation where a controller 120, 122 stops operating in the multi-controller configuration, e.g., a power failure occurs.

In contrast, prior systems only use write back cache if both BBUs are in a known charged state. Without using the method provided by the present invention, in the event of a failed controller, prior controllers must resort to a conservative write through cache mode until the BBU for the replacement controller is reconditioned. To reach a known charged state the BBU must be reconditioned. This involves a discharge cycle, a charge cycle, a complete discharge cycle, and a final charge cycle. This takes many hours during which the controllers both operate in write through cache mode and suffer the degraded performance. However, in the write through cache mode, data from the host is written through the cache onto a disk drive and status is returned to the host only after the data is written to the drive. The write through cache mode is slower than simply writing data to a cache and thus decreases system performance.

According to the present invention, if one of the controllers 120, 122 fails, a replacement controller, e.g., 120, is installed in the multi-controller configuration to replace the failed controller. The controller that continues to operate in a multi-controller RAID configuration when one of the controllers has failed is referred to as the surviving controller, e.g., 122. Cooperation between a new replacement controller 120 and the survivor controller 122 is enabled so that write back cache operation can start immediately, and not be dependant on the condition of the BBU 132 in the replacement controller 120.

FIG. 2 illustrates a table 200 showing the state information that each controller must maintain and shared with the other controllers. FIG. 2 illustrates that each controller must maintain information 210 regarding both its BBU 212 and the BBU of the other controller(s) 214. The states 220 associated with information regarding its BBU 212 include "OK" 230 and "Not OK" 232. In the "OK" state 230, the battery can be relied upon to preserve the cache data. In the "Not OK" state 232, the battery can not be relied upon to preserve the cache data. Likewise, the states associated with information regarding the BBU of other controller's BBU 214 include "OK" 240 and "Not OK" 242. In the "OK" state 240, the battery can be relied upon to preserve the cache data. In the "Not OK" state 242, the battery can not be relied upon to preserve the cache data.

Because multi-controller RAID systems copy their cache from one controller to another, it is possible to rely on another controller's battery-backed cache, even if the battery on the current controller is not ready to be relied upon to protect the data. Thus, increased performance can be achieved by using the write back cache mode even if only one cache battery is in a known charged state.

FIG. 3 illustrates a flow chart 300 of the sequence for a failed controller replacement according to the present invention. In FIG. 3, the multi-controller starts out in a normal state 310. Then, one controller fails and the surviving controller uses a write through cache mode 312. A replacement controller is installed 320. Battery state information is exchanged between controllers 322. Then, the controllers determine whether any battery is acceptable for operating in a write back cache mode 324. A battery backup is acceptable if it meets a predetermined criteria, such as a charge threshold. As long as there is a single battery that is acceptable 326, the controllers can operate in the write back cache mode 328. If neither battery is acceptable 330, all controllers operate in a write through cache mode 332. A determination is made whether the battery for the replacement controller needs reconditioning 340. If not 342, the system reverts to the normal state again 310. If the battery for the replacement controller needs reconditioning 344, the batteries are reconditioned 346.

If the reconditioning is completed 350, the system reverts to the normal state 310. Otherwise 352, a check is made to see whether a replacement controller or a survivor controller fails 354. If a replacement controller fails during reconditioning 360, the survivor controller uses the write through cache mode 362. Then, the failed replacement controller is replaced by installing a new replacement controller 320. The data is still protected by being stored in the survivor controller's cache 364.

If the survivor controller fails during reconditioning 370, the replacement controller uses the write through cache mode 372. Then, a second replacement controller is installed for the survivor controller 320. However, when a new replacement for the former survivor is installed, two recently installed replacement controllers are in the system and it is likely that neither one of the batteries will be acceptable 380. In this scenario, the write through cache mode 332 will be used until one of the batteries has been reconditioned. The data is still protected by being stored in the replacement controller's cache 382. Thus, during the reconditioning process, it does not matter which of the two controllers fail. The data is still valid in both cases. However, after the second failure, the remaining controller changes to write through cache 332.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for operating a first and a second controller within a disk array system, wherein each controller comprises a processor, a battery backup and a cache memory backed-up by the battery backup, comprising:
   a) operating a first and a second controller in a write back cache mode when the first and second controller are in a normal state;
   b) switching the second controller to a write through cache mode when the first controller fails;
   c) replacing the first controller that failed with a replacement controller;
   d) exchanging state information regarding the battery backup for the replacement controller and the second controller;
   e) determining whether either battery backup of the replacement controller and the second controller meets a predetermined threshold; and
   f) running the replacement controller and the second controller in a write back cache mode when the battery backup for the replacement controller or the second controller meets the predetermined threshold.

2. The method of claim 1 further comprising:
   g) running the replacement controller and second controller in a write through cache mode when the battery backup for the replacement controller and the second controller fail to meet the predetermined threshold.

3. The method of claim 2 further comprising:
   h) determining whether the battery backup for the replacement controller needs reconditioning; and
   i) reconditioning the battery backup for the replacement controller when the battery backup for the replacement controller needs reconditioning.

4. The method of claim 3 further comprising switching the operation of the second controller to a write through cache mode when the replacement controller fails before the reconditioning for the battery backup for the replacement controller is completed.

5. The method of claim 4 further comprising reinstalling the failed replacement controller and repeating a–i.

6. The method of claim 3 further comprising switching the operation of the replacement controller to a write through cache mode when the second controller fails before the reconditioning for the battery backup for the replacement controller is completed.

7. The method of claim 6 further comprising installing a second replacement controller for the failed second controller and repeating a–i.

8. A disk array system, comprising:
   at least a first and a second controller for receiving data write operations from a host, the first and second controller each further comprising a processor, a battery backup and a cache memory, the cache memory being maintained by the battery backup; and
   an array of disks coupled to the first and second controller;
   wherein the processors for the first and second controller are each configured with a state machine for cooperatively sharing a state for their associated battery backup and for storing a state of the battery backup for the other controller so that the state machine for each controller knows the state of its own battery backup and the state of the battery backup of the other controller, wherein the processor operates the first and the second controller in a write back cache mode when the first and second controller are in a normal state, the processor for the second controller switching to a write through cache mode when the first controller fails and a replacement controller is installed for the failed first controller, wherein the replacement controller and the second controller share state information, and wherein the processors for the second and replacement controller determine whether either battery backup of the replacement controller and the second controller meets a predetermined threshold and run the replacement controller and the second controller in a write back cache mode when the battery backup for the replacement controller or the second controller meets the predetermined threshold.

9. The disk array system of claim 8 wherein the processor for the replacement controller and the second controller run the replacement controller and second controller in a write through cache mode when the battery backup for the replacement controller and the second controller fail to meet the predetermined threshold.

10. The disk array system of claim 9 wherein the processor for the replacement controller determines whether the battery backup for the replacement controller needs reconditioning and begins reconditioning the battery backup for the replacement controller when the battery backup for the replacement controller needs reconditioning.

11. The disk array system of claim 10 wherein the processor for the second controller switches the operation of the second controller to a write through cache mode when the replacement controller fails before the reconditioning for the battery backup for the replacement controller is completed.

12. The disk array system of claim 10 wherein the processor for the replacement controller switches the operation of the replacement controller to a write through cache mode when the second controller fails before the reconditioning for the battery backup for the replacement controller is completed.

13. An article of manufacture comprising a program storage medium readable by a computer, the medium tangibly embodying one or more programs of instructions executable by the computer to perform a method for operating a first and a second controller within a disk array system, wherein each controller comprises a processor, a battery backup and a cache memory backed-up by the battery backup, comprising:
   a) operating a first and a second controller in a write back cache mode when the first and second controller are in a normal state;
   b) switching the second controller to a write through cache mode when the first controller fails;
   c) replacing the first controller that failed with a replacement controller;
   d) exchanging state information regarding the battery backup for the replacement controller and the second controller;
   e) determining whether either battery backup of the replacement controller and the second controller meets a predetermined threshold; and
   f) running the replacement controller and the second controller in a write back cache mode when the battery backup for the replacement controller or the second controller meets the predetermined threshold.

14. The article of manufacture of claim 13 further comprising:

g) running the replacement controller and second controller in a write through cache mode when the battery backup for the replacement controller and the second controller fail to meet the predetermined threshold.

15. The article of manufacture of claim 14 further comprising:

h) determining whether the battery backup for the replacement controller needs reconditioning; and i) reconditioning the battery backup for the replacement controller when the battery backup for the replacement controller needs reconditioning.

16. The article of manufacture of claim 15 further comprising switching the operation of the second controller to a write through cache mode when the replacement controller fails before the reconditioning for the battery backup for the replacement controller is completed.

17. The article of manufacture of claim 16 further comprising reinstalling the failed replacement controller and repeating a–i.

18. The article of manufacture of claim 15 further comprising switching the operation of the replacement controller to a write through cache mode when the second controller fails before the reconditioning for the battery backup for the replacement controller is completed.

19. The article of manufacture of claim 18 further comprising installing a second replacement controller for the failed second controller and repeating a–i.

* * * * *